United States Patent [19]

Kuhman

[11] Patent Number: 4,604,251

[45] Date of Patent: Aug. 5, 1986

[54] METHOD AND APPARATUS FOR INDICATING DIMENSIONAL RELATIONSHIPS IN PLASTIC MATERIAL FEEDING DEVICE DURING OPERATION

[76] Inventor: Jeffrey A. Kuhman, 8905 Hawthorne Blvd., Tecumseh, Mich. 49286

[21] Appl. No.: 745,297

[22] Filed: Jun. 14, 1985

[51] Int. Cl.[4] .......................................... G01R 33/12
[52] U.S. Cl. ................... 264/40.2; 425/169; 116/208; 324/207; 198/502.1; 198/657
[58] Field of Search ............... 116/208; 425/168, 169; 264/40.1, 40.2; 324/207; 198/502.1, 657

[56] References Cited

U.S. PATENT DOCUMENTS

| | | | |
|---|---|---|---|
| 2,921,298 | 1/1960 | Jackson | 324/207 |
| 3,231,813 | 1/1966 | Vanator | 324/207 |
| 3,357,049 | 12/1967 | Spindler | 425/169 |
| 3,556,258 | 1/1971 | Winge et al. | 116/208 |
| 4,066,949 | 1/1978 | Condrac | 324/207 |
| 4,175,331 | 11/1979 | Johnson | 116/208 |
| 4,199,718 | 4/1980 | Ikeda et al. | 324/207 |
| 4,209,121 | 6/1980 | Newcomb | 324/207 |
| 4,338,071 | 7/1982 | Daubenbuchel et al. | 264/40.2 |
| 4,487,310 | 12/1984 | Sansoucy | 198/657 |
| 4,518,917 | 5/1985 | Oates et al. | 324/207 |

FOREIGN PATENT DOCUMENTS

| | | | |
|---|---|---|---|
| 1116006 | 10/1961 | Fed. Rep. of Germany | 324/207 |
| 729884 | 5/1955 | United Kingdom | 324/207 |
| 836116 | 6/1960 | United Kingdom | 324/207 |
| 2025305 | 1/1980 | United Kingdom | 425/169 |
| 375472 | 5/1973 | U.S.S.R. | 324/207 |
| 802066 | 2/1981 | U.S.S.R. | 264/40.1 |

Primary Examiner—Tim Miles
Attorney, Agent, or Firm—Marshall & Melhorn

[57] ABSTRACT

An apparatus and method for indicating wear or misalignment between a screw and barrel in a plastic material feeder includes forming an aperture in a side wall of the barrel and positioning a proximity detecting probe in the aperture. The probe generates a detection signal having a magnitude proportional to the distance between a selected reference point on the inner wall of the barrel and an outer edge of the flight as it rotates past. The detection signal is stored and displayed as a visual indication of the distance. The stored signal can be selectively reset and two or more probe detection signals can be selectively displayed.

12 Claims, 3 Drawing Figures

METHOD AND APPARATUS FOR INDICATING DIMENSIONAL RELATIONSHIPS IN PLASTIC MATERIAL FEEDING DEVICE DURING OPERATION

DESCRIPTION OF THE PRIOR ART

Typically, bulk plastic material is fed into an extruder, an injection molding machine or a blow molder through a barrel or cylinder utilizing a rotating helical screw. Such a machine is operated at an elevated temperature and if it is required to be shut down, the plastic material tends to solidify. Many plastic materials are highly abrasive and tend to wear the flights on the screw thereby widening the gap between the outer edge of the flights and the inner surface of the barrel or cylinder. Such a condition will tend to prevent the uniform free flow of material through the barrel thereby causing problems in the consistency of the plastic material. Other problems that can occur are galling in the barrel through adhesive wear or metal to metal contact and misalignment of the screw through excessive shear or deflection of the screw mechanism.

Previously, the only way to check the dimensional clearances in such a mechanism was to shut it down and remove the screw from the barrel. Since the plastic material would solidify, the screw and the barrel would have to be cleaned and the dimensions checked utilizing mechanical measuring devices. Then, the mechanism would have to be reassembled. Such a procedure tended to result in lost production time and did not completely eliminate the occasional breakdowns between regular measurements.

SUMMARY OF THE INVENTION

The present invention concerns an apparatus and method for checking the dimensional relationship between the screw flights and the inner diameter of a barrel or cylinder during the operation of the plastic material feed device. Utilizing the Foucault current or eddy method of detection, a probe is located in an aperture formed in the side of the barrel or cylinder. The end of the probe is positioned near the inner surface of the barrel or cylinder. The probe generates an electrical signal having a magnitude proportional to the distance between the outer edge of the flight on the screw and a sensing coil located in the probe. The probe output signal is sensed and converted to a digital distance display for use by the machine operator. The magnitude of the signal can be scaled to generate a display number representing the actual measurement between the edge of the flight screw and the inside of the barrel or cylinder in English or metric units.

DESCRIPTION OF THE PREFERRED EMBODIMENT

Figure 1:
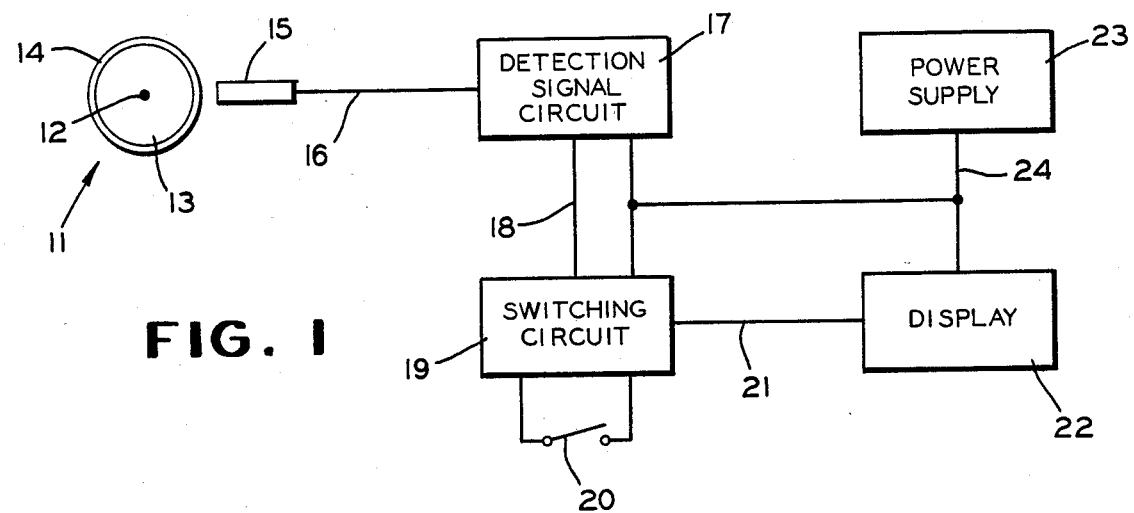
FIG. 1 is a schematic representation of an apparatus for measuring displacement according to the present invention.

There is shown in FIG. 1 a schematic representation of an apparatus for detecting screw wear or misalignment according to the present invention. A screw 11 rotates about a longitudinal axis 12. The screw 11 is formed of a generally cylindrical body 13 having a helical flight or thread 14 formed on an exterior surface of the body 13. A probe 15 is positioned adjacent the flight 14 to sense the distance between an end of the probe and an outer edge of the flight. The probe 15 generates a detection signal along a cable 16 to a detection signal circuit 17.

The probe 15, cable 16 and detection signal circuit 17 are manufactured by Helm Instrument Co., Inc., 4511 South Ave., Toledo, Ohio 43615 as a Distec ® displacement detector. This apparatus is available in many probe configurations depending on the distance to be measured and the output signal to be generated. The magnitude of the output signal generated by the detection signal circuit 17 on a line 18 is proportional to the distance between the end of the probe 15 and the outer edge of the flight 14.

The output signal on the line 18 is an input to a switching circuit 19. The switching circuit 19 incorporates a conventional signal holding circuit which stores the magnitude of the signal on the line 18 at the time a reset switch 20 is closed. This stored signal is generated on a line 21 to a display circuit 22 whereby an indication of the distance between the probe and the flight is displayed as a number in a selected mode of measurement. Various conventional digital or analog displays could be utilized for the display 22, but a digital display in English or metric units is preferred. The probe 15, circuits 17 and 19 and the display 22 are provided with electrical power by a power supply 23 on a line 24. The detection signal circuit 17 requires minus eighteen volts direct current and the switching circuit 19 and the display 22 can be supplied with one or more values of direct or alternating current power.

Figure 2:
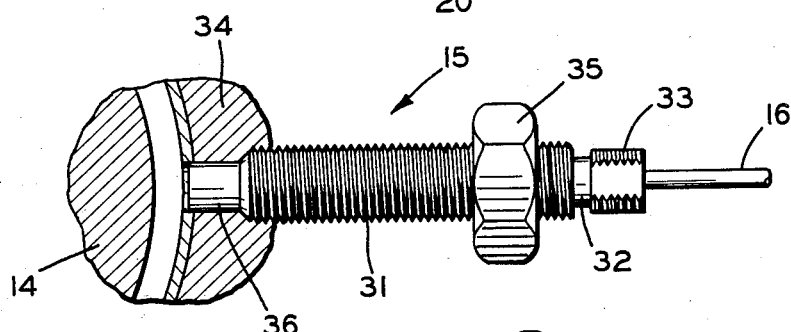
FIG. 2 is a plan view of a probe utilized in the apparatus shown in FIG. 1.

The probe 15 of FIG. 1 is shown in plan view in FIG. 2. The probe 15 has a generally cylindrical body with an externally threaded central portion 31. At one end of the probe 15 is a relatively short, narrower diameter portion 32 connecting the body portion 31 to a squared off head portion 33. The head portion 33 is adapted to be gripped by an open end or adjustable wrench, or similar tool for threading the body 31 into a threaded aperture in a wall of a barrel or cylinder 34. A nut 35 is threaded onto the body portion 31 and is utilized as a stop nut against an outer surface of the barrel 34 (not shown) or a spacer (not shown) positioned between the nut 35 and the outer surface of the barrel 34.

A sensor assembly 36 is positioned at an end of the probe body 31 opposite the head portion 33 and includes a wire coil (not shown) connected to the cable 16. The probe 15 has a bore (not shown) formed therein coextensive with the longitudinal axis of the body 31 to permit the connection of the coil with the cable 16.

Figure 3:
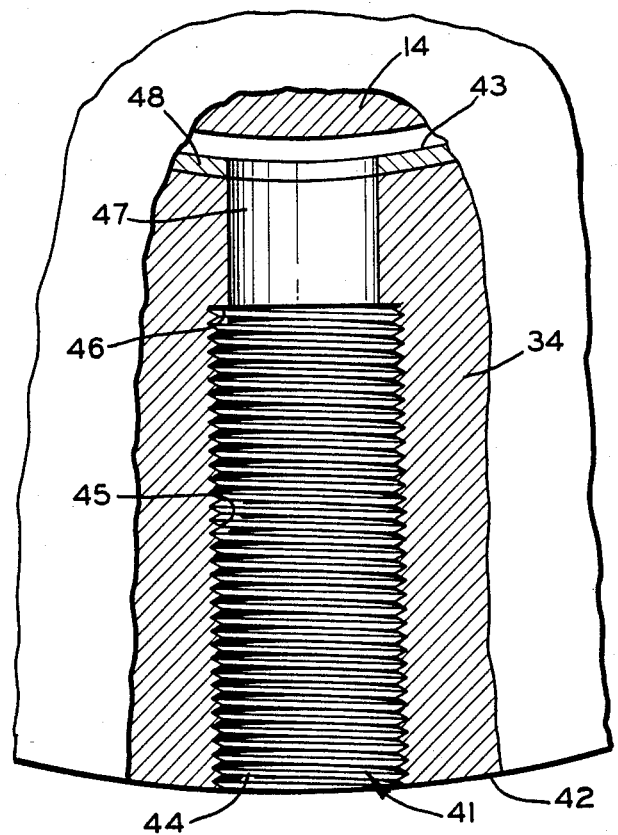
FIG. 3 is a plan view taken as if in partial cross-section through the screw and barrel of a plastic material feeder showing an aperture formed to accept the probe of FIG. 2.

There is shown in FIG. 3 a plan view of an extruder barrel and screw taken as if in partial cross-section. An aperture 41 is formed in the wall of the barrel 34 extending from an outer surface 42 to an inner surface 43 adjacent an outer edge of the flight on the screw 14. The aperture 41 is formed with a larger diameter area 44, which is threaded its entire length as shown at 45, that terminates in a step surface 46. The aperture 41 then extends as a narrower diameter portion 47 from the step surface 46 to the inner surface 43 of the barrel 34 through an inner liner 48. The distance between the sensor assembly 36 shown in FIG. 2 and the outer surface of the flight of the screw is approximately 0.035 inch to 0.040 inch.

As the probe 15 is threaded into the aperture 41, the one end of the threaded section 31 comes into contact with the step surface 46 which functions as a stop to position the probe with the sensing end 36 in the proper position for sensing the distance between the probe end and the outer edge of the flight 14.

The method according to the present invention concerns forming an aperture in a side wall of a feeder barrel or cylinder, placing an eddy current sensing probe in the aperture, and generating an output signal from said probe having a magnitude proportional to the distance between an end of the probe and an outer edge of a flight on a screw in the barrel. The magnitude of the signal is selectively stored to generate an output signal for driving a display which is an indication of the distance between the outer surface of the flight and the inner surface of the barrel.

The apparatus and method according to the present invention provide an accurate indication of screw wear and/or misalignment during the operation of a plastic material feeder. Such an indication tends to eliminate the regular shutdowns and disassembly for measurement previously required. Furthermore, the device provides an early warning of a pending breakdown and indicates the right time for preventative maintenance or screw changeover. Thus, a screw can now be changed at the exact point in screw wear life when the plasticizing rate drops off significantly. The location and number of probes required to monitor the screw are determined by an analysis of the critical points in the particular feeder. Each probe can then be connected to associated ones of the circuits and display shown in FIG. 1, or two or more probes can be selectively connected to the same set of circuits through a conventional multi-pole switch.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

What is claimed is:

1. An apparatus for indicating the dimensional relationship between an external surface of a flight on a screw and a predetermined reference point on an inner surface of a barrel in a plastic material feeder comprising:
    an eddy current sensing probe positioned in an aperture formed in a side wall of a barrel of a plastic material feeder, said probe being located adjacent a predetermined reference point on an inner surface of the barrel and adjacent the path of travel of an outer edge of a flight on a screw in the barrel;
    a detection signal circuit connected to said probe for exciting said probe and for generating an output signal with a magnitude proportional to the distance between said probe and the outer edge of the flight; and
    means responsive to said output signal for generating an indication of the distance between the outer edge of the flight and said predetermined reference point.

2. The apparatus according to claim 1 wherein said means for generating an indication includes a storage means for storing a value of said output signal.

3. The apparatus according to claim 2 wherein said means for generating an indication includes switch means for selectively connecting said output signal to said storage means to reset said value of said output signal in storage.

4. The apparatus according to claim 2 including a display means responsive to the value of said output signal in said storage means for generating a visual indication of the distance between the outer edge of the flight and said predetermined reference point.

5. The apparatus according to claim 4 wherein said visual indication is in decimal form.

6. The apparatus according to claim 1 wherein the aperture is formed with a larger diameter portion extending from an outer surface of the barrel side wall and connected to a smaller diameter portion extending to the inner surface of the side wall to form a step surface to provide a stop to position said probe.

7. An apparatus for indicating a selected dimensional relationship between a screw and a barrel of a material feeder during operation comprising:
    a proximity detecting probe positioned in an aperture formed in a side wall of a feeder barrel adjacent a predetermined reference point on an inner surface of the barrel and a path of travel of a flight on a screw rotating in the barrel, said probe generating a detection signal having a magnitude proportional to the distance between the flight and said predetermined reference point; and
    means responsive to said detection signal for generating a visual indication of the distance between the flight and said predetermined reference point.

8. The apparatus according to claim 7 including a second proximity detecting probe positioned in a second aperture formed in the side wall of the barrel adjacent a second predetermined reference point on the inner surface of the barrel and the path of travel of the flight for generating a second detection signal having a magnitude proportional to the distance between the flight and said second predetermined reference point and means for selectively connecting said detection signals to said means for generating a visual indication.

9. The apparatus according to claim 7 including means for storing the value of said detection signal and switch means for selectively resetting said means for storing.

10. A method of indicating the dimensional relationship between and outer surface of a flight on a screw and an inner surface of a barrel in a plastic material feeder comprising the steps of:
    a. forming an aperture in an inner surface of a barrel of a feeder;
    b. positioning a proximity sensing probe in said aperture;
    c. generating a detection signal with said probe while said feeder is operating representing the distance between a predetermined reference point on the inner surface of the barrel and an outer surface of a flight on a screw rotating in the barrel; and
    d. generating a visual indication of the distance in response to said detection signal.

11. The method according to claim 10 including repeating steps a., b. and c. one or more times and selectively performing step d. for each one of said detection signals generated.

12. The method according to claim 10 wherein step a. is performed by forming a larger diameter portion from an outer surface into a side wall of the barrel and forming a smaller diameter portion from the inner surface to connect with said larger diameter portion and to form a step to locate said probe in said aperture.

* * * * *